United States Patent
Schmidt et al.

(10) Patent No.: US 7,063,370 B2
(45) Date of Patent: Jun. 20, 2006

(54) AUTOMOTIVE MOVABLE CENTER STACK PANEL WITH DECORATIVE SURFACE LINKAGE

(75) Inventors: Robert Mark Schmidt, Livonia, MI (US); James Bernard Wright, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/711,440

(22) Filed: Sep. 19, 2004

(65) Prior Publication Data

US 2006/0061123 A1 Mar. 23, 2006

(51) Int. Cl.
*B62D 25/14* (2006.01)
(52) U.S. Cl. ....................................... 296/70
(58) Field of Classification Search .................. 296/70
See application file for complete search history.

(56) References Cited

U.S. PATENT DOCUMENTS

| | | | |
|---|---|---|---|
| 6,176,534 B1 | 1/2001 | Duncan | |
| 6,354,649 B1 | 3/2002 | Lee | |
| 6,499,788 B1 * | 12/2002 | Ito et al. | 296/70 |
| 6,666,492 B1 * | 12/2003 | Schmidt et al. | 296/70 |
| 6,709,041 B1 | 3/2004 | Hotary et al. | |
| 6,719,343 B1 * | 4/2004 | Emerling et al. | 296/24.34 |
| 2002/0003354 A1 | 1/2002 | Inoue et al. | |
| 2003/0001406 A1 * | 1/2003 | Shibata et al. | 296/70 |
| 2003/0197392 A1 | 10/2003 | Clark et al. | |
| 2004/0041426 A1 | 3/2004 | Lee | |
| 2005/0006918 A1 * | 1/2005 | Neumann et al. | 296/24.34 |

* cited by examiner

*Primary Examiner*—Dennis H. Pedder
(74) *Attorney, Agent, or Firm*—Earl LaFontaine

(57) ABSTRACT

An automotive center stack panel assembly is providing comprising an automotive instrument panel assembly having a recessed display chamber formed therein. A video display panel assembly is mounted within the recessed display chamber. A pivot link assembly has a first fixed pivot end rotatably mounted to the automotive instrument panel assembly and a second fixed pivot end. A control panel has an upper control panel end and a lower control panel end. The second fixed pivot end is rotatably mounted to the upper control panel end such that the control panel is pivotable between a display hidden position and a display exposed position. The control panel covers the recessed display chamber when in the display hidden position.

19 Claims, 2 Drawing Sheets

US 7,063,370 B2

AUTOMOTIVE MOVABLE CENTER STACK PANEL WITH DECORATIVE SURFACE LINKAGE

TECHNICAL FIELD

The present invention relates generally to an automotive movable center stack panel with hidden display and more particularly to an automotive movable center stack panel with hidden display utilizing a decorative surface linkage.

BACKGROUND OF THE INVENTION

Automotive dash and control panels have been designed to incorporate an ever increasing array of controls and features. The increasing number of features has placed an increased value on instrument panel real estate. Increased density of controls and displays can hamper operator interaction. It is preferably for such interactions to be simplified so as to minimize distraction from primary vehicle operation. Under these desirable design constraints, automotive designers are now directed to incorporate navigation and other video displays into the already burdened center stack panels.

The video displays must be a reasonable dimension to facilitate easy visibility for a range of occupant sizes and proportions. The dimensions suitable for proper viewing can require a significant region of the center stack panel. Additionally, mounting a video display on the outer surface of the center stack panel often produces viewing angles that are poorly optimized for operation viewing. In this fashion, incorporation of video displays into the center stack or other vehicle control regions provides a significant challenge to automotive designers. It would be highly desirable to have a video display that provided a wide range of visibility for various occupants without resulting in an overly increased density of additional controls and features.

An additional challenge regarding video displays stems from the nature of their use within the automotive environment. Use for navigation and entertainment often only represents a small portion of vehicle operational time. During the remaining portions of time when the displays are not utilized they represent underutilized space within the vehicle interior. They may also create an undesirable appearance or distraction when they are not in operation. It would, therefore, be highly desirable to have a video display that only usurped valuable panel space when in operation.

SUMMARY OF THE INVENTION

It is, therefore, an object of the present invention to provide an automotive center stack panel with hidden display. It is a further object of the present invention to provide such an automotive center stack panel which minimizes the impact of the display on control feature density.

An automotive center stack panel assembly is providing comprising an automotive instrument panel assembly having a recessed display chamber formed therein. A video display panel assembly is mounted within the recessed display chamber. A pivot link assembly has a first fixed pivot end rotatably mounted to the automotive instrument panel assembly and a second fixed pivot end. A control panel has an upper control panel end and a lower control panel end. The second fixed pivot end is rotatably mounted to the upper control panel end such that the control panel is pivotable between a display hidden position and a display exposed position. The control panel covers the recessed display chamber when in the display hidden position.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
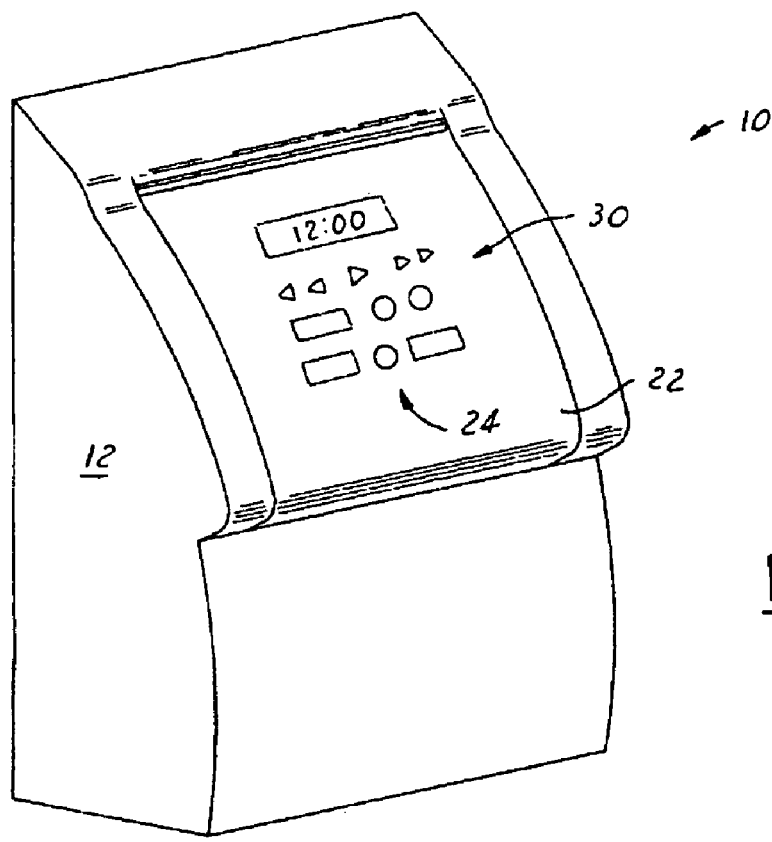
FIG. 1 is an illustration of an automotive center stack panel assembly in accordance with the present invention, the automotive center stack panel assembly illustrated in the display hidden position.

Referring now to FIG. 1, which is an illustration of an automotive center stack panel assembly 10 in accordance with the present invention. The automotive center stack panel assembly 10 illustrated is intended to encompass a wide variety of instrument panel assemblies suitable for automotive applications. As such, the automotive center stack panel assembly 10 includes an automotive instrument panel assembly 12 having an instrument panel outer surface 14. Such instrument panel assembles 12 are known outer finish elements within the automotive industry. The present invention, however, further includes a recessed display chamber 16 formed into the automotive instrument panel assembly 12. A video display panel assembly 18 is mounted at the rear of the recessed display chamber 16. This allows the video display view orientation 20 to be optimized for any occupants without regard to the contour of the instrument panel outer surface 14. It is contemplated that the video display panel assembly 18 may encompass a wide variety of applications, although a navigation system or audio system is preferred.

Figure 2:
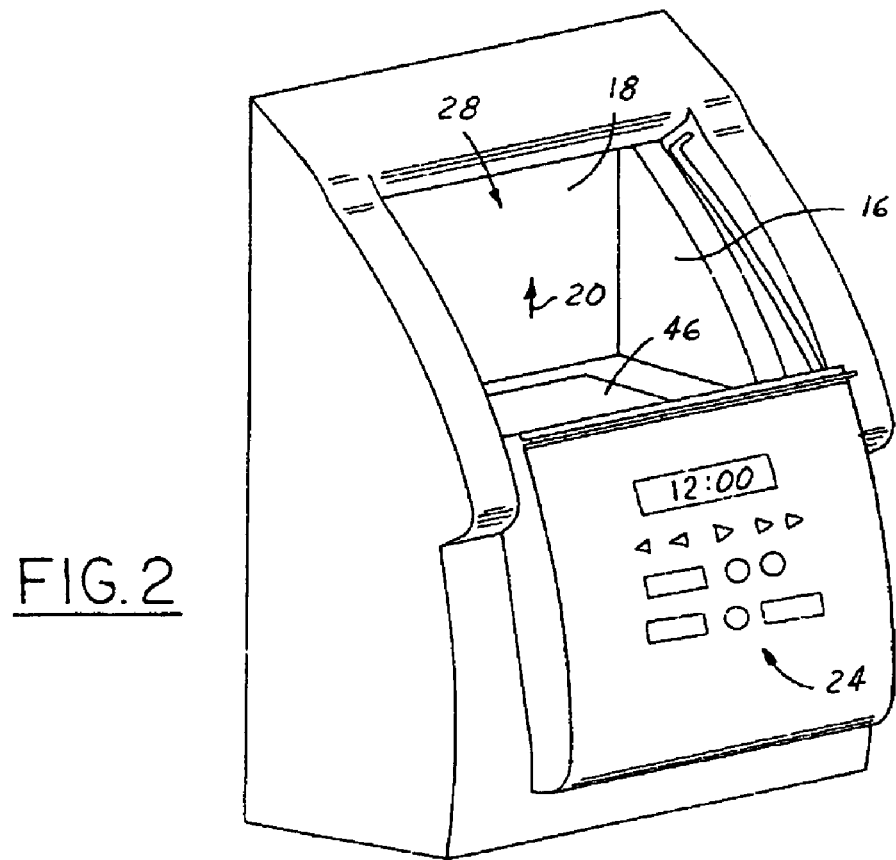
FIG. 2 is an illustration of the automotive center stack panel assembly illustrated in FIG. 1, the automotive center stack panel assembly illustrated in the display exposed position.

The present invention allows for selective use of the video display panel assembly 18 through the use of a control panel 22 pivotably mounted to the instrument panel assembly 12. Control panels 22 are known to provide access to a variety of controls and features within the automotive environment. The control panel 22 includes a plurality of control buttons 24 positioned on the control panel outer surface 26. The control panel 22 is pivotably movable between a display exposed position 28 (see FIG. 2) and a display hidden position 30. In the display hidden position 30 the control panel 22 moves upward to completely cover the recessed display chamber 16. This provides a plurality of benefits. By covering the recessed display chamber 16, the control panel 22 prevents the video display panel assembly 18 from becoming a distraction or giving an unsightly appearance when not activated. Additionally, by moving upward into the display hidden position 30, the control panel 22 moves the plurality of control buttons 24 upwards where they may be more easily accessed by a vehicle operator. The control panel 22 preferably moves between the display hidden position 30 and the display exposed position 28 while the control outer surface 26 remains coincident with the instrument panel outer surface 24. This insures a positive finish appearance in both positions while more effectively hiding the recessed display chamber 16 when in the display hidden position 28.

Figure 3:
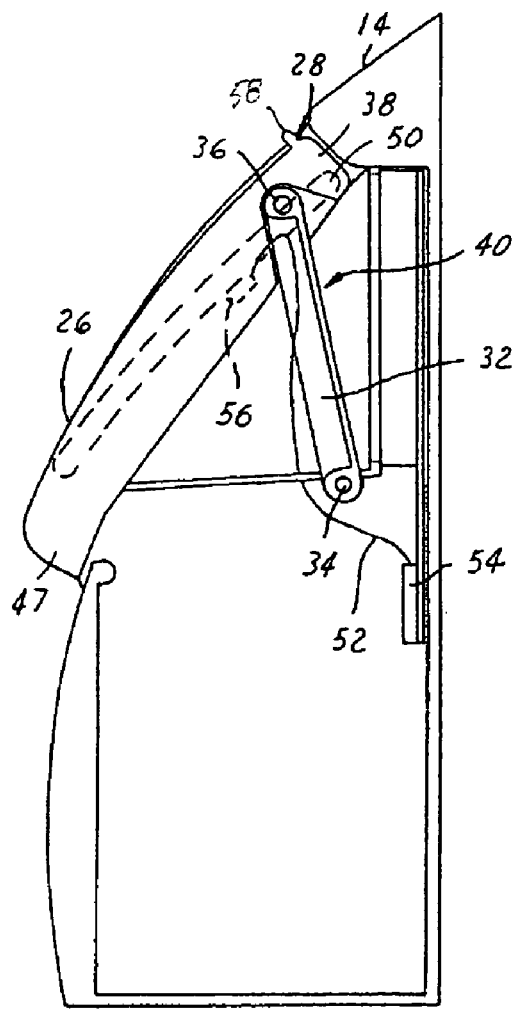
FIG. 3 is a cross-sectional illustration of the automotive center stack panel assembly illustrated in FIG. 2.
Figure 4:
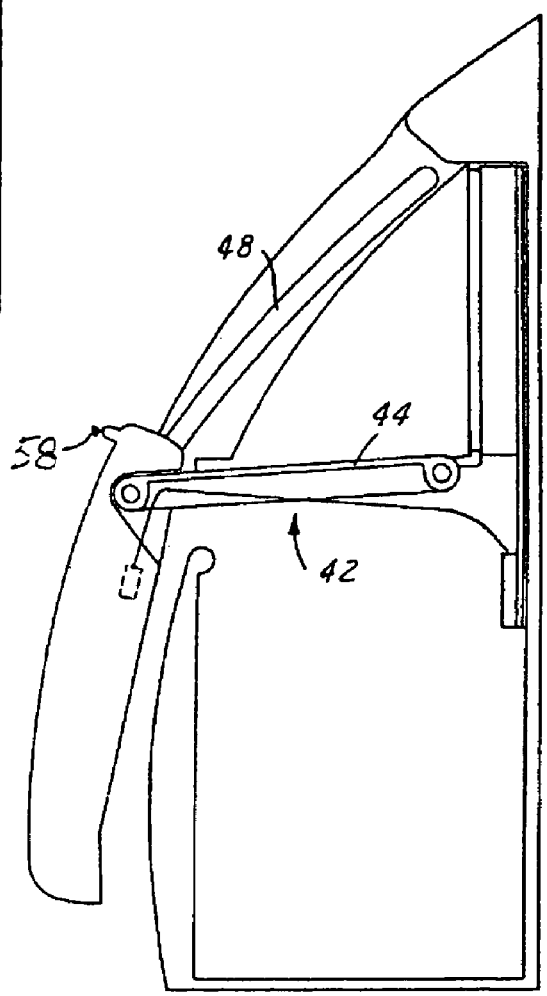
FIG. 4 is a cross-sectional illustration of the automotive center stack panel assembly illustrated in FIG. 1.

The present invention controls movement of the control panel 22 through a unique mechanical configuration illustrated in FIGS. 3 and 4. The present invention includes a pivot link assembly 32 connecting the control panel 22 to the instrument panel assembly 12. The pivot link assembly 32 may comprise a pair of pivot links formed on the sides of the control panel 22. The pivot link assembly 32 includes a first fixed pivot end 34 rotatably mounted to the instrument panel assembly 12. The pivot link assembly 32 further includes a second fixed pivot end 36 rotatably mounted to a upper control panel end 38. The pivot link assembly 32 is rotatable between a vertical pivot stowed position 40 and a horizontal pivot deployed position 42. A linkage panel 44 may be mounted to the pivot link assembly 32 such that the linkage panel 44 forms a shelf 46 in the recessed display chamber 16 when the control panel 22 is in the display exposed position 28. The lower control panel end 47 preferably moves downward to move the control panel 22 into the display exposed position 28.

The present invention further contemplates the use of a guide slot 48 formed in the instrument panel assembly 12. A roller element 50 rotatably mounted to the upper control panel end 38 is rotatably positioned within the guide slot 48 such that the control panel 22 follows the contour of the instrument panel outer panel surface 14 as it is pivoted between the display hidden position 30 and the display exposed position 28. It additionally provides upper and lower stops for movement of the control panel 22. A flexible electronics cable 52 provides communication between the video display panel assembly 18 and the control panel 22. The flexible electronics cable 52 has a first cable end 54 in communication with the video display panel assembly 18 and a second cable end 56 in communication with the control panel 22. This allow the plurality of control buttons 24 to control the video display panel assembly 18 in either the display exposed position 28 or the display hidden position 30. Additionally, the use of the linkage panel 44 protects and hides from view the flexible electronics cable 52 when the control panel 22 is in the display exposed position 28. This provides a unique and effective mechanical connection between the control panel 22 and the video panel display assembly 18. Additionally an upper engagement element 58 may be utilized to frictionally engage the control panel 22 to retain it in the display hidden position 30. Although a single upper engagement 58 element has been described, alternate embodiment would be obvious to one skilled in the art in light of the present specification.

While particular embodiments of the invention have been shown and described, numerous variations and alternative embodiments will occur to those skilled in the art. Accordingly, it is intended that the invention be limited only in terms of the appended claims.

The invention claimed is:

1. An automotive center stack panel assembly comprising:
    an automotive instrument panel assembly;
    a recessed display chamber formed in said instrument panel assembly;
    a video display panel assembly mounted within said recessed display chamber;
    a pivot link assembly having a first fixed pivot end rotatably mounted to said automotive instrument panel assembly and a second fixed pivot end;
    a control panel having an upper control panel end and a lower control panel end, said second fixed pivot end rotatably mounted to said upper control panel end such that said control panel is pivotable between a display hidden position and a display exposed position, said control panel covering said recessed display chamber when in said display hidden position; and
    a linkage panel mounted to said pivot link assembly, said linkage panel forming a shelf in said recessed display chamber when said control panel is in said display exposed position.

2. An automotive center stack panel assembly as described in claim 1, wherein said control panel includes a control panel outer surface generally coincident with an instrument panel outer panel surface when said control panel is in said display hidden position.

3. An automotive center stack panel assembly as described in claim 1, further comprising:
    at least one upper engagement element frictionally engaging said control panel when said control panel is in said display hidden position.

4. An automotive center stack panel assembly as described in claim 1, further comprising:
    a flexible electronics cable having a first cable end mounted to said video display panel assembly and a second cable end mounted to said control panel.

5. An automotive center stack panel assembly as described in claim 4, wherein:
    said linkage panel hides said flexible electronics cable when in said display exposed position.

6. An automotive center stack panel assembly as described in claim 1, further comprising:
    a plurality of control buttons positioned on a control panel outer surface.

7. An automotive center stack panel assembly as described in claim 1, wherein said video display panel assembly comprises a navigation system.

8. An automotive center stack panel assembly comprising:
    an automotive instrument panel assembly;
    a recessed display chamber formed in said instrument panel assembly;
    a video display panel assembly mounted within said recessed display chamber;
    a pivot link assembly having a first fixed pivot end rotatable mounted to said automotive instrument panel assembly and a second fixed pivot end;
    a control panel having an upper control panel end and a lower control panel end, said second fixed pivot end rotatable mounted to said upper control panel end such that said control panel is pivotable between a display hidden position and a display exposed position, said control panel covering said recessed display chamber when in said display hidden position;
    a guide slot formed in said automotive instrument panel assembly; and
    at least one roller element mounted to said control panel, said at least one roller element slidably positioned within said guide slot.

9. An automotive center stack panel assembly as described in claim 4, further comprising:
    a plurality of control buttons positioned on a control panel outer surface, said flexible electronics cable in communication with said plurality of control buttons and said video display panel assembly such that said plurality of control buttons may be utilized to control said video display panel assembly.

10. An automotive center stack panel assembly comprising:
- an automotive instrument panel assembly;
- a recessed display chamber formed in said instrument panel assembly;
- a video display panel assembly mounted within said recessed display chamber;
- a pivot link assembly having a first fixed pivot end rotatably mounted to said automotive instrument panel assembly and a second fixed pivot end;
- a control panel having an upper control panel end and a lower control panel end, said second fixed pivot end rotatably mounted to said upper control panel end such that said control panel is pivotable between a display hidden position and a display exposed position, said control panel covering said recessed display chamber when in said display hidden position;
- a plurality of control buttons positioned on a control panel outer surface;
- a guide slot formed in said automotive instrument panel assembly; and
- at least one roller element mounted to said control panel, said at least one roller element slidably positioned within said guide slot.

11. An automotive center stack panel assembly as described in claim 10, wherein said control panel includes a control panel outer surface generally coincident with an instrument panel outer panel surface when said control panel is in said display hidden position.

12. An automotive center stack panel assembly as described in claim 10, further comprising:
- a linkage panel mounted to said pivot link assembly, said linkage panel forming a shelf in said recessed display chamber when said control panel is in said display exposed position.

13. An automotive center stack panel assembly as described in claim 10, further comprising:
- a flexible electronics cable having a first cable end mounted to said video display panel assembly and a second cable end mounted to said control panel, said flexible electronics cable in communication with said control panel and said video display panel assembly such that said control panel may be utilized to control said video display panel assembly.

14. An automotive center stack panel assembly as described in claim 13, wherein said flexible electronics cable provides communication between said video display panel assembly and said plurality of control buttons.

15. An automotive center stack panel assembly as described in claim 10, wherein said video display panel assembly comprises a navigation system.

16. An automotive center stack panel assembly as described in claim 13, further comprising:
- a linkage panel mounted to said pivot link assembly, said linkage panel forming a shelf in said recessed display chamber when said control panel is in said display exposed position, said linkage panel hiding said flexible electronics cable when in said display exposed position.

17. A method of accessing a video display panel assembly within an automotive center stack panel assembly comprising:
- pivoting a control panel from a display hidden position to a display exposed position thereby exposing a video display panel assembly mounted within a recessed display chamber, said control panel rotatably engaged to an automotive instrument panel assembly by way of a pivot link assembly having a first fixed pivot end rotatably mounted to said automotive instrument panel assembly and a second fixed pivot end rotatably mounted to an upper control panel end; and
- rotating said control panel from said display exposed position to said display hidden position to cover said video display panel assembly when said video display panel assembly is not in use.

18. A method as described in claim 17, further comprising:
- controlling said video display panel assembly using a plurality of control buttons positioned on a control panel outer surface, said plurality of control buttons communicating with said video display panel assembly by way of a flexible electronics cable connecting said control panel assembly to said video display panel assembly.

19. A method as described in claim 18, further comprising:
- hiding said flexible electronics cable using a linkage panel mounted to said pivot link assembly, said linkage panel forming a shelf in said recessed display chamber when said control panel is in said display exposed position.

* * * * *